US006723393B1

(12) United States Patent
Niyama et al.

(10) Patent No.: US 6,723,393 B1
(45) Date of Patent: *Apr. 20, 2004

(54) LIQUID CRYSTAL OPTICAL ELEMENT AND METHOD FOR PREPARING THE SAME

(75) Inventors: Satoshi Niyama, Yokohama (JP); Shinya Tahara, Yokohama (JP)

(73) Assignee: Asahi Glass Company, Limited, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/807,425

(22) PCT Filed: Oct. 9, 1999

(86) PCT No.: PCT/JP99/05765

§ 371 (c)(1),
(2), (4) Date: Jul. 3, 2001

(87) PCT Pub. No.: WO00/23539

PCT Pub. Date: Apr. 27, 2000

(30) Foreign Application Priority Data

Oct. 20, 1998 (JP) .......................................... 10-298620
Oct. 20, 1998 (JP) .......................................... 10-298621
Oct. 20, 1998 (JP) .......................................... 10-298624

(51) Int. Cl.$^7$ .............................................. C09K 19/00

(52) U.S. Cl. ..................... 428/1.1; 252/299.6; 349/183; 349/186

(58) Field of Search ....................... 252/299.01–299.63; 428/1.1; 349/86, 88, 183, 186, 83, 89

(56) References Cited

U.S. PATENT DOCUMENTS

| 5,103,327 A | 4/1992 | Hirai et al. |
| 5,188,760 A | 2/1993 | Hikmet et al. |
| 5,216,531 A | 6/1993 | Hirai et al. |
| 5,674,576 A | 10/1997 | Gotoh et al. |

(List continued on next page.)

FOREIGN PATENT DOCUMENTS

| EP | 0 562 681 | * 9/1993 | ......... H01L/41/193 |
| JP | 1-272551 | 10/1989 | |
| JP | 2-89023 | 3/1990 | |
| WO | WO 93/22397 | 11/1993 | |
| WO | WO 94/8268 | 4/1994 | |

OTHER PUBLICATIONS

Hlkmet, R.A.M., "Anisotropic Gels Obtained by Photopolymerization in the Liquid Crystal State", *Liquid Crystals in Complex Geometries, Formed by Polymer and Porous Networks*, Taylor & Francis, 1798, pp. 53–82.

Hikmet, R.A.M., "Electrically Induced Light Scattering from Anisotropic Gels with Negative Dielectric Anisotropy", *Mol. Cryst. Liq. Cryst.*, 1992, pp. 117–131.

(List continued on next page.)

*Primary Examiner*—Mark F. Huff
*Assistant Examiner*—Jennifer R. Sadula
(74) *Attorney, Agent, or Firm*—Oblon, Spivak, McClelland, Maier & Neustadt, P.C.

(57) ABSTRACT

A liquid crystal/cured composite layer is formed by sandwiching a mixture of a liquid crystal with an uncured curable compound i.e. a curable compound represented by a structure of an acryloyl group—$(OR_1)_n$—O-mesogen structural portion-O—$(R_2O)_m$-acryloyl group structure (wherein each of $R_1$ and $R_2$ is a $C_{2-6}$ alkylene group, and each of n and m is from 1 to 10), between a pair of substrates provided with transparent electrodes, and curing the curable compound.

16 Claims, 1 Drawing Sheet

U.S. PATENT DOCUMENTS

| | | | |
|---|---|---|---|
| 5,686,017 A | * 11/1997 | Kobayashi et al. | 252/299.01 |
| 5,691,795 A | 11/1997 | Doane et al. | |
| 5,863,457 A | * 1/1999 | Hasebe et al. | 252/299.01 |
| 6,018,378 A | 1/2000 | Hirai et al. | |
| 6,128,056 A | * 10/2000 | Kubota et al. | 349/86 |
| 6,171,518 B1 | * 1/2001 | Hikmet et al. | 252/299.01 |
| 6,576,303 B1 | * 6/2003 | Tamura et al. | 428/1.1 |

OTHER PUBLICATIONS

Litt, Morton, H., et al., "Crosslinked Liquid Crystal Polymers from Liquid Crystal Monomers: Synthesis and Mechanical Properties", *Journal of Polymer Sciences, Part A: Polymer Chemistry*, vol. 31, 1993, pp. 183–191.

* cited by examiner

A MIXTURE OF A COMPOUND OF THE FORMULA:

$$CH_2=CH-\overset{O}{\overset{\|}{C}}-O-CH_2-CH_2-O-\phantom{x}\!\!\!\!\bigcirc\!\!-\!\!\bigcirc\!\!\phantom{x}-O-CH_2-CH_2-O-\overset{O}{\overset{\|}{C}}-CH=CH_2$$

WITH A LIQUID CRYSTAL, IS SANDWICHED BETWEEN A PAIR OF SUBSTRATES PROVIDED WITH ELECTRODES

↓

THE CURABLE COMPOUND IS CURED

10

- 1A
- 2A
- 3A
- 4
- 3B
- 2B
- 1B

LIQUID CRYSTAL OPTICAL ELEMENT AND METHOD FOR PREPARING THE SAME

This application is a CPA of U.S. application Ser. No. 09/807,425, filed on Jul. 3, 2001, now abandoned, which is a 371 of international application PCT/JP99/05765, filed on Oct. 9, 1999.

TECHNICAL FIELD

The present invention relates to a liquid crystal optical element whereby the transmittance, scattering and go reflection state of the element is controlled by application/non-application of an electric field and which is useful for e.g. a light-controlling element, a display element or an optical shutter.

BACKGROUND ART

A transmission/scattering type optical element has been proposed in which a liquid crystal and a transparent polymer are combined to form a difference in the refractive index between the polymer and the liquid crystal or in the interior of the liquid crystal (among microscopic regions). It is called, for example, a liquid crystal/polymer composite element, a liquid crystal/resin composite element or a dispersion type liquid crystal element. In principle, this element requires no polarizing plate, whereby the light absorption loss is small, and a high scattering performance can be obtained, and thus, it has a significant merit in that the light utilizing efficiency in the entire element is high.

By utilizing such characteristics, it is employed for a light-controlling glass, an optical shutter, a laser apparatus and a display apparatus. One showing a scattering state under application of no voltage and a transparent state under application of a voltage, has been commercialized.

Further, prior art reference 1 (U.S. Pat. No. 5,188,760) discloses an element employing a liquid crystal and a polymerizable liquid crystal. According to this prior art reference 1, under application of no voltage, the element shows a transparent state as observed from any direction as the liquid crystal and the polymerized liquid crystals in the element have the same alignment direction, and under application of a voltage, the alignment of the liquid crystals in the element is controlled by an electric field, and the alignment direction of liquid crystal molecules changes variously in the microscopic regions, whereby the element shows a scattering state.

Further, it has been disclosed that the contrast ratio can be improved by adding a chiral agent to provide a helical structure in the initial alignment. This element is called "an anisotropic gel" or "a liquid crystal gell". In this prior art reference 1, a mesogen monomer having acryloyl groups at the terminals was used.

Further, prior art reference 2 (PCT International Publication WO92/19695) also discloses an element having a similar structure. The operation mode was the same as in prior art reference 1, and a very small amount of a polymer is dispersed in the chiral nematic liquid crystal to obtain a transparent state under application of no voltage and a scattering state under application of a voltage. This element is called PSCT (polymer stabilized cholesteric texture). Also in this prior art reference 2, a mesogen monomer having acryloyl groups at the terminals, was disclosed.

Characteristics of a liquid crystal optical device obtained by preparing a mixture comprising a liquid crystal and an uncured curable compound, and curing the curable compound to form a liquid crystal/cured composite layer, depend largely on the structure of the liquid crystal/cured composite. Further, the molecular structure of the uncured curable compound to be used, will give a substantial influence over the structure of the formed liquid crystal/cured composite.

It has been reported that in general, with a curable compound containing a mesogen structure such as a biphenyl structure, curable sites at both ends will bond, the modulus of elasticity after being cured is large, and the glass transition temperature of the obtainable polymer is also high.

On the other hand, this means that restrictions are given to the free volume and the molecular motion of the curable compound during the curing, and at the later stage of the curing process, the reactivity of the curable sites is likely to be suppressed, and there has been a problem that the curing reaction tends to be not enough, or a very long curing time will be required.

Namely, as the structures of uncured curable compounds, prior art reference 1 has disclosed the compound of the formula (2), and the prior art reference 2 has disclosed the compound of the formula (3);

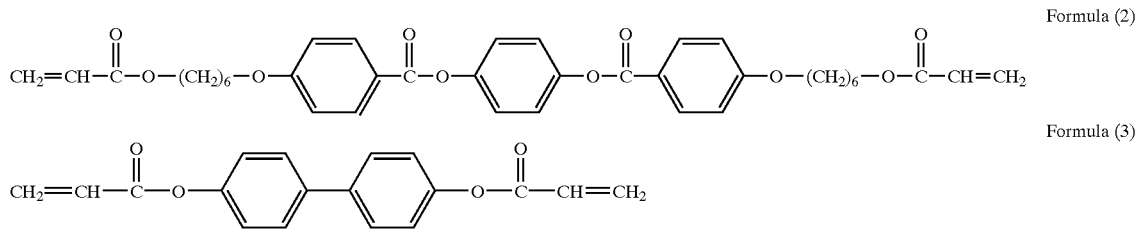

However, the cured products formed by using these compounds alone had characteristics attributable to the molecular structures. Namely, with the element disclosed in prior art reference 1, it is essential to use a monomer having a liquid crystal nature, and accordingly, the uncured curable compound contains a highly crystallizable rigid mesogen structural portion as shown in the formula (2), while with the compound of the formula (3) to be used in prior art reference (2), the distance between the mesogen structural portion and the curable site (an acryloyl group in this case) is short, and accordingly, the molecular weight between the crosslinking points tends to be small, whereby the obtained cured products tend to be hard and brittle. Further, for the same reason, the mobility of the uncured sites during the curing will be substantially impaired, whereby there has been a problem that a long curing time is required for adequate curing.

Further, with the liquid crystal optical elements of the prior art references, the voltage transmittance curves of the elements were likely to change by driving of application of an electric field for a plurality of times, and the contrast between application and non-application of an electric field, was still low. Particularly, the physical properties of the resin as the cured product of the liquid crystal/cured composite layer, related to the electro-optical characteristics of the liquid crystal optical element, and if the modulus of elasticity of the resin was too high or too brittle, the required driving voltage tended to be high, and at a relatively low driving voltage range, no adequate contrast ratio in the reflectance change or in the transmittance change was sometimes obtained between application and non-application of a voltage.

Further, as a means to improve the contrast ratio in the transmittance (or the reflectance) of a liquid crystal optical element obtainable between application and non-application of a voltage in the prior art, prior art reference 1 proposes to add a chiral agent to the mixture and to introduce a helical structure to the alignment mode of the curable compound after the curing, and prior art reference 2 proposes to add a chiral agent to bring the helical pitch to a level of from 0.5 to 4 μm.

However, the addition of the chiral agent may sometimes cause a problem such that it increases the driving voltage of the element or it decreases the transmittance when the element is transparent. Further, when a mixture of a liquid crystal with an uncured curable compound, is injected into a liquid crystal cell, or when it is sandwiched between substrates provided with transparent electrodes, such as resin films provided with electrodes, if the chiral agent is contained in a large amount, there will be a problem that injection irregularities or sandwiching irregularities are likely to result.

The present invention provides a liquid crystal optical element having high reliability and high contrast, whereby the voltage transmittance curve of the element will not substantially change even by driving of application or non-application of an electric field for a plurality of times. Further, it provides a production method whereby a liquid crystal optical element can be produced easily and constantly in good yield.

Further, it provides a liquid crystal optical element which can be produced, for example, in a short period of curing time and which has a high contrast ratio even at a low driving voltage.

Further, it provides a liquid crystal optical element, whereby addition of the chiral agent can be minimized, and a high contrast ratio can be obtained in the transmittance characteristics obtainable at the time of application and non-application of a voltage, and the driving voltage may be not increased as far as possible.

DISCLOSURE OF THE INVENTION

The present invention provides a method for producing a liquid crystal optical element, which comprises sandwiching a mixture of a liquid crystal with an uncured curable compound between a pair of substrates which are provided with transparent electrodes and of which at least one is transparent, and curing the curable compound to form a liquid crystal/cured composite layer, wherein the curable compound contains a compound of the formula (1):

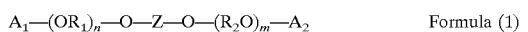    Formula (1)

wherein each of $A_1$ and $A_2$ which are independent of each other, is an acryloyl group, a methacryloyl group, a glycidyl group or an allyl group; each of $R_1$ and $R_2$ which are independent of each other, is a $C_{2-6}$ alkylene group; Z is a bivalent mesogen structure; and each of n and m which are independent of each other, is an integer of from 1 to 10.

Further, in one embodiment, the present invention provides the above-mentioned method wherein Z is a 4,4'-biphenylene group, or a 4,4'-biphenylene group having part or all of hydrogen substituted by $C_{1-2}$ alkyl or halogen atoms.

Further, in one embodiment, the present invention provides the production method wherein each of $R_1$ and $R_2$ which are independent of each other, is an ethylene group or a propylene group.

Further, in one embodiment, the present invention provides the production method wherein each of $A_1$ and $A_2$ which are independent of each other, is an acryloyl group or a methacryloyl group.

Further, in one embodiment, the present invention provides the production method wherein each of n and m which are independent of each other, is from 1 to 4.

Further, in one embodiment, the present invention provides the production method wherein the curable compound contains two types of curable compounds, of which the molecular weights are different by at least two times. In the above production method, three or more compounds having different molecular weights may be employed, so long as at least two types of compounds among them satisfy the above-mentioned conditions.

Further, in one embodiment, the present invention provides the method for producing a liquid crystal optical device wherein the curable compound contains a curable compound containing a mesogen structural portion in its molecule and a curable compound containing no mesogen structural portion.

Further, in one embodiment, the present invention provides the method for producing a liquid crystal optical element wherein the mixture contains a chiral agent, and the helical pitch of the chiral agent is at least 4 μm and at most three times of the electrode gap. Thus, by employing a large helical pitch which has not heretofore been employed, a high contrast ratio and a low driving voltage can be satisfied at the same time.

Further, the present invention provides a liquid crystal optical element produced by means of the above production method.

BEST MODE FOR CARRYING OUT THE INVENTION

Figure 1:
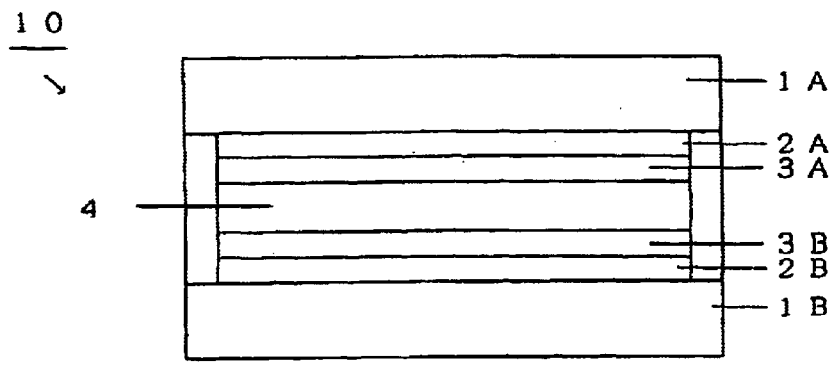
FIG. 1 is a flow chart showing an embodiment of the method for producing a liquid crystal optical element of the present invention.

In the present invention, an oxyalkylene structure having a high molecular mobility is introduced between the mesogen structural portion and the curable site in the uncured curable compound, whereby the molecular mobility at the curable site in the curing process can be improved, and it is possible to obtain a liquid crystal optical element which has a high reliability and a high contrast, even by a curing reaction for a short time, whereby the state under application or non-application of an electric field, is stable. In FIG. 1, a flow chart of one embodiment of the method for producing a liquid crystal optical element of the present invention, will be shown.

The curable sites ($A_1$, $A_2$) of the formula (1) may be any of the above-mentioned functional groups which are photo curable or heat curable usually in the presence of a curing catalyst. Among them, an acryloyl group or a methacryloyl group suitable for photo curing, is preferred, since the temperature for the curing can be controlled.

The carbon numbers of the oxyalkylene portions $R_1$ and $R_2$ of the formula (1) are preferably from 2 to 6 from the viewpoint of the mobility. Further, a chain of an ethylene group having a carbon number of 2 and a propylene group having a carbon number of 3, are preferred.

As the mesogen structural portion (Z) of the formula (1), a bivalent polyphenylene having at least two 1,4-phenylene groups bonded, is preferred. Further, some of 1,4-phenylene groups in this polyphenylene group may be bivalent organic groups substituted by a 1,4-cyclohexylene group.

Some or all of the hydrogen atoms of such a polyphenylene group or a bivalent organic group may be substituted by a substituent such as a $C_{1-2}$ alkyl group, a halogen atom, a carboxyl group or an alkoxycarbonyl group. Preferred Z is a biphenylene group having two 1,4-phenylene groups bonded (hereinafter referred to as a 4,4'-biphenylene group), a terphenylene group having three such phenylene groups bonded, and a bivalent is organic groups having from 1 to 4 hydrogen atoms of such a group substituted by a $C_{1-2}$ alkyl group, a fluorine atom, a chlorine atom or a carboxyl group. Most preferred Z is a 4,4'-biphenylene group having no substituent.

If n and m of the formula (1) are too large, the compatibility with the liquid crystal deteriorates, and each of them is from 1 to 10, further preferably from 1 to 4 taking into consideration the characteristics of the element after curing.

In the present invention, the uncured curable compound may contain two types of curable compounds, of which the molecular weights are different by at least two times, whereby the molecular weight between the crosslinking points of the resin during the curing process or after the curing may be changed. Or, the crystallinity of the resin may be controlled. The curing property in the curing process can be thus improved, and the modulus of elasticity of the resin after the curing can be adjusted, whereby it is possible to obtain a liquid crystal optical element which is capable of presenting a high contrast even at a low driving voltage.

In order to adjust the compatibility with the liquid crystal before the curing and the modulus of elasticity of the resin after the curing, it is preferred that the uncured curable compound contains a curable compound containing a mesogen structural portion in its molecule and a curable compound containing no such a structural portion. Because, the mesogen structural portion improves the compatibility with the liquid crystal before the curing, while it tends to increase the modulus of in elasticity of the resin after the curing more than necessary.

It is preferred that the contained two types of uncured curable compound can be bonded to each other, thereby to avoid phase separation of resins in the resin formed by curing and to avoid an increase of the haze at the time of reflection or transmission.

In order to lower the modulus of elasticity of the resin after curing by improving the curing property during the curing by increasing the molecular weight between the crosslinking points, it is preferred to employ a curable compound having a relatively large molecular weight as the uncured curable compound. Specifically, a curable compound having a molecular weight of at least 1000, is preferred.

The mixture of a liquid crystal with an uncured curable compound, may contain a curing catalyst, and in the case of photo curing, a photo polymerization initiator which is commonly used for a photo curable resin may be employed such as a benzoin ether type, an acetophenone type or a phosphine oxide type. In the case of thermosetting, a curing catalyst such as a peroxide type, a thiol type, an amine type or an acid anhydride type, may be used depending upon the type of the curable sites, and if necessary, a curing assistant such as an amine may also be used.

The content of the curing catalyst is preferably at most 20 wt % of the uncured curable compound contained, and in a case where a high molecular weight or a high resistivity is required for the cured product after curing, it is more preferably from 1 to 10 wt %.

Further, in order to improve the contrast of the element between application and non-application of an electric field, a chiral agent may be added to the mixture of a liquid crystal with an uncured curable compound. The helical pitch thereby induced is preferably at least 4 µm and at most three times of the electrode gap, since if it is too small, the driving voltage will increase, and if it is too large, no adequate contrast will be obtained.

If the helical pitch is smaller than 4 µm, there will be a problem that the transmittance at the time of no application of a voltage tends to be low, or the driving voltage will increase. Further, if the helical pitch is larger than three times of the gap between the pair of electrodes sandwiching the liquid crystal/resin composite, the transmittance under application of a voltage will be high, and the contrast ratio in the transmittance between application and non-application of a voltage, tends to be low.

Further, by adjusting the helical pitch to be larger than 5 µm and at least two times of the electrode gap, it will be possible to adjust the balance of the low driving voltage and the high contrast.

In order to improve the compatibility with liquid crystal, the uncured curable compound in the mixture of liquid crystal with the curable compound, may contain a plurality of uncured curable compound differing in n and m in the formula (1), whereby the contrast may further be improved.

On the other hand, the mixture of a liquid crystal with an uncured curable compound, is preferably a homogeneous solution after mixing. Further, the mixture of a liquid crystal with an uncured curable compound may show a liquid crystal phase when sandwiched between the substrates provided with electrodes.

The mixture of a liquid crystal with an uncured curable compound, may show a liquid crystal phase when it is cured. It is also possible to impart a function to align the liquid crystal to the electrode surface by directly rubbing the electrode surface of the substrates provided with electrodes, which sandwich the mixture of a liquid crystal with an uncured curable compound, or by forming a thin film of a resin thereof and rubbing the thin film, whereby it is possible to reduce irregularities at the time of sandwiching the mixture of a liquid crystal and an uncured curable compound.

Further, the combination of the alignment directions of the pair of alignment-treated substrates may be parallel or orthogonal, and the angle may be set to make the irregularities be minimum at the time of sandwiching the mixture.

Figure 2:
FIG. 2 is a diagrammatic cross-sectional view of an embodiment of the liquid crystal optical element of the present invention.

The distance between the electrodes may be maintained by e.g. a spacer, and the gap is preferably from 5 to 50 µm, more preferably from 5 to 30 μm. If the electrode gap is too small, the contrast tends to deteriorate, and if it is too large, the driving voltage will increase. FIG. 2 shows a schematic cross-sectional view of a liquid crystal optical element of the present invention.

Figure 3:
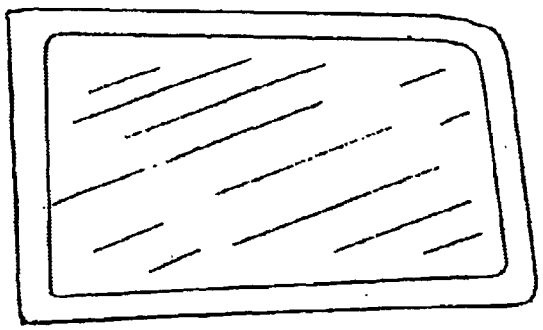
FIG. 3 is a diagrammatic view showing one embodiment of the liquid crystal optical element of the invention as an automobile glass.

It is a liquid crystal optical element 10 comprising glass substrates 1A and 1B, electrodes 2A and 2B, alignment films 3A and 3B and a liquid crystal/cured composite layer 4. It is an element which exhibits a transparent state at the time of non-application of a voltage and a scattering state at the time of application of a voltage. FIG. 3 is a view schematically illustrating a state in which a liquid crystal optical element of the present invention is used as a window glass of an automobile. It has a merit in that the transmittance in an oblique direction is high.

The substrates supporting electrodes, may be glass substrates or resin substrates, or a combination of a glass substrate and a resin substrate. Further, one side may be a reflecting electrode made of an aluminum or dielectric multi-layer film.

In the case of film substrates, the productivity is high, because it is possible that continuously supplied substrates provided with electrodes, are sandwiched between pairs of rubber rolls, and a mixture of a liquid crystal and an uncured curable compound, having a spacer incorporated and dispersed therein, is sandwiched between them, followed by continuous curing.

In the case of glass substrates, a very small amount of a spacer is distributed inside of the electrode surfaces, and the four sides of the opposing substrates are sealed with a sealing agent such as an epoxy resin to form a sealed cell, and one of cutouts of the seal formed at two or more portions is dipped in a mixture of a liquid crystal with an uncured curable compound, and suctioning from the other to fill the mixture into the cell, followed by curing to obtain a liquid crystal optical element. Otherwise, a vacuum injection method may also be employed.

Now, the present invention will be described in detail with reference to Examples 1 to 7 (Examples of the present invention) and Examples A to E (Comparative Examples).

EXAMPLE 1

A mixture (mixture A) comprising 95 parts of a cyano type nematic liquid crystal (BL-006, manufactured by Merck, dielectric anisotropy: positive), 5 parts of an uncured curable compound of the formula (4) and 0.15 part of benzoin isopropyl ether, was prepared.

having a diameter of 13 μm, and bonding the substrates via the resin beads by an epoxy resin printed along the four sides with a width of about 1 mm.

This liquid crystal cell was maintained at 25° C. and ultraviolet rays of 3 mW/cm$^2$ from the upper side and ultraviolet rays of about 3 mW/cm2 from the lower side, were irradiated for 10 minutes by a HgXe lamp having a main wavelength of about 365 nm, to prepare a liquid crystal optical element.

An operation of applying a voltage of 50 Vrms with a rectangular wave of 50 Hz to this liquid crystal optical element for 10 minutes and then removing the voltage, was repeated ten times. Then, the transmittance of the liquid crystal cell was measured by a transmittance measuring system (F value of the optical system: 11.5) employing a measuring light source having a center wavelength of 530 nm and a full width at half maximum value of about 20 nm, whereby the transmittance was 79% in a state where no voltage was applied, 23% in a state where 50 Vrms was applied, and the difference in the transmittance between application and non-application of the voltage, was 56%.

Example A

A liquid crystal optical element was prepared in the same manner as in Example 1 except that an uncured curable compound of the formula (3) (4,4'-bisacryloyloxybiphenyl) was used instead of the compound of the formula (4) as the uncured curable compound.

This compound of the formula (3) corresponds to a compound of the formula (1) wherein $A_1$ and $A_2$ are each an acryloyl group, the mesogen structural portion of Z is a 4,4'-biphenylene group, and each of n and m is 0.

To this liquid crystal optical element, a voltage was applied in the same manner as in Example 1. Then, the transmittance was measured by the same measuring system as in Example 1, whereby the transmittance was 72% in a state where no voltage was applied, 29% in a state where 50 Vrms was applied, and the difference in the transmittance between the application and non-application of the voltage, was 43%.

EXAMPLE 2

A mixture (mixture B) having 2.5 wt % of a chiral agent (a mixture of S-811, manufactured by Merck and C15 manufactured by Merck in a weight ratio of 1:1) dissolved in mixture A prepared in Example 1, was prepared.

This mixture B was injected into the same liquid crystal cell as in Example 1, and while maintaining it at 25° C.,

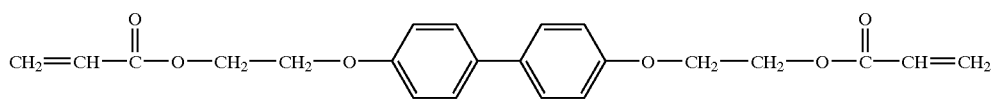

Formula (4)

This compound of the formula (4) corresponds to a compound of the formula (1) wherein $A_1$ and $A_2$ are each an acryloyl group, $R_1$ and $R_2$ are each an ethylene group, the mesogen structural portion of Z is a 4,4'-biphenylene group, and each of n and m is 1.

This mixture A was injected into a liquid crystal cell prepared by disposing a pair of substrates having polyimide thin films formed on transparent electrodes and rubbed in one direction, to face so that the rubbing directions crossed each other, dispersing a very small amount of resin beads ultraviolet rays of 3 mW/cm$^2$ from the upper side and ultraviolet rays of about 3 mW/cm$^2$ from the lower side were irradiated for 3 minutes by the same HgXe lamp having a main wavelength of about 365 nm as in Example 1, to obtain a liquid crystal optical element.

An operation of applying a voltage of 50 Vrms with a rectangular wave of 50 Hz to this liquid crystal optical element for 10 minutes and then removing the voltage, was repeated ten times. Then, the transmittance was measured by a transmittance measuring system (F value of the optical system: 11.5) employing a measuring light source having a center wavelength of 530 nm and a full width at half maximum value of about 20 nm, whereby the transmittance was 78% in a state where no voltage was applied, and the value of a contrast obtained by dividing this value by the transmittance at the time when 50 Vrms was applied, was 33.

EXAMPLE 3

A liquid crystal optical element was obtained in the same manner as in Example 2 except that an uncured curable compound of the formula (5) was used instead of the compound of the formula (4) as the uncured curable compound.

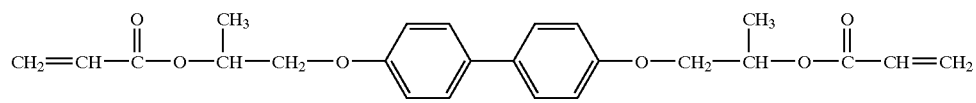

Formula (5)

This compound of the formula (5) corresponds to a compound of the formula (1) wherein $A_1$ and $A_2$ are each an acryloyl group, $R_1$ and $R_2$ are each a propylene group, the mesogen structural portion of Z is a 4,4'-biphenylene group, and each of n and m is 1.

To this liquid crystal optical element, a voltage was applied in the same manner as in Example 2, and then the transmittance was measured by the same measuring system, whereby the transmittance was 80% in a state where no voltage was applied, and the value of a contrast obtained by dividing this value by the transmittance at the time when 50 Vrms was applied, was 28.

Example B

A liquid crystal optical element was obtained in the same manner as in Example 2 except that a compound of the formula (3) was used instead of the compound of the formula (4) as the uncured curable compound. To this liquid crystal optical element, a voltage was applied in the same manner as in Example 2, and then the transmittance was measured by the same measuring system whereby the transmittance was 61% in a state where no voltage was applied, and the value of a contrast obtained by dividing this value by the transmittance at the time when 50 Vrms was applied, was 17.

EXAMPLE 4

A mixture (mixture C) comprising 97 parts of one having 2.5 wt % of the chiral agent used in Example 2, uniformly dissolved in a cyano type nematic liquid crystal (BL-009, manufactured by Merck), 3 parts of an uncured curable compound of the formula (4) and 0.09 part of benzoin isopropyl ether, was prepared.

This mixture C was injected into the same liquid crystal cell as in Example 1, and while maintaining at 25° C., ultraviolet rays of 3 mW/cm² from the upper side and ultraviolet rays of about 3 mW/cm² from the lower side, were irradiated for 30 minutes by the same HgXe lamp having a main wavelength of about 365 nm as in Example 1, to obtain a liquid crystal optical element.

An operation of applying a voltage of 20 Vrms with a rectangular wave of 50 Hz to this liquid crystal optical element for 10 minutes and then removing the voltage, was repeated ten times. Then, the transmittance was measured by the same transmittance measuring system as mentioned above employing a measuring light source having a center wavelength of 530 nm and a full width at half maximum value of about 20 nm, whereby the transmittance was 82% in a state where no voltage was applied, and the value of a contrast obtained by dividing this value by the transmittance at the time when 20 Vrms was applied, was 11.

Further, an operation of applying a voltage of 30 Vrms with a rectangular wave of 50 Hz to this liquid crystal optical element for 10 minutes and then removing the voltage, was repeated ten times, and then the transmittance was measured in the same manner, whereby the transmittance was 82% in a state where no voltage was applied, and the value of a contrast obtained by dividing this value by the transmittance at the time when 30 Vrms was applied, was 40.

EXAMPLE 5

A mixture (mixture D) comprising 97 parts of one having 2.5 wt % of the chiral agent used in Example 2, uniformly dissolved in a cyano type nematic liquid crystal (BL-009, manufactured by Merck), 2 parts of an uncured curable compound of the formula (4), 1 part of an uncured curable compound of the formula (6) and 0.09 part of benzoin isopropyl ether, was prepared.

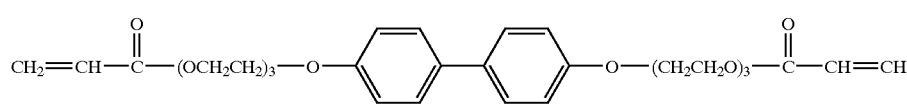

Formula (6)

This compound of the formula (6) corresponds to a compound of the formula (1) wherein $A_1$ and $A_2$ are each an acryloyl group, $R_1$ and $R_2$ are each an ethylene group, the mesogen structural portion of Z is a 4,4'-biphenylene group, and each of n and m is 3.

This mixture D was injected into the same liquid crystal cell as in Example 1, and while maintaining it at 25° C., ultraviolet rays of 3 mW/cm² from the upper side and ultraviolet rays of about 3 mW/cm² from the lower side, were irradiated for 30 minutes by the same HgXe lamp having the main wavelength of about 365 nm as in Example 1, to prepare a liquid crystal optical element.

An operation of applying a voltage of 20 Vrms with a rectangular wave of 50 Hz to this liquid crystal optical element for 10 minutes and then removing the voltage, was repeated ten times. Then, the transmittance was measured by the same transmittance measuring system as mentioned above employing a measuring light source having a center wavelength of 530 nm and a full width at half maximum value of about 20 nm, whereby the transmittance was 82% in a state where no voltage was applied, and the value of a contrast obtained by dividing this value by the transmittance at the time when 20 vrms was applied, was 28.

Example C

A liquid crystal optical element was obtained in the same manner as in Example 4 except that a compound of the formula (3) was used instead of the compound of the formula (4) as the uncured curable compound. An operation of applying a voltage of 20 Vrms with a rectangular wave of 50 Hz to this liquid crystal optical element for 10 minutes and then removing the voltage, was repeated ten times.

Then, the transmittance was measured by the same transmittance measuring system as mentioned above employing a measuring light source having a center wavelength of 530 nm and a full width at half maximum value of about 20 nm, whereby the transmittance was 57% in a state where no voltage was applied, and the value of a contrast obtained by dividing this value by the transmittance at the time when 20 Vrms was applied, was 10.

Further, an operation of applying a voltage of 30 Vrms with a rectangular wave of 50 Hz to this liquid crystal optical element for 10 minutes and then removing the voltage, was repeated ten times, and then the transmittance was measured in the same manner as described above, whereby the transmittance was 49% in a state where no voltage was applied, and the value of a contrast obtained by dividing this value by the transmittance at the time when 30 Vrms was applied, was 6.

EXAMPLE 6

A mixture (mixture E) having 65 parts of a cyano type nematic liquid crystal (BL-006, manufactured by Merck), 35 parts of a chiral agent (a mixture of R-811, manufactured by Merck and CB15 manufactured by Merck in a weight ratio of 1:1), 3.1 parts of an uncured curable compound of the formula (4) and 0.09 part of benzoin isopropyl ether, was prepared.

This mixture E was infected into the same liquid crystal cell as in Example 1, and while maintaining it at 25° C., ultraviolet rays of 3 mW/cm$^2$ from the upper side and ultraviolet rays of about 3 mW/cm$^2$ from the lower side, were irradiated for 30 minutes by the same HgXe lamp having a main wavelength of about 365 nm as in Example 1, to prepare a liquid crystal optical element.

An operation of applying a voltage of 50 Vrms with a rectangular wave of 50 Hz to this liquid crystal optical element for 10 minutes and then removing the voltage, was repeated ten times. Then, the liquid crystal optical element was placed on black paper which did not substantially reflect light, and the reflectance was measured by a reflectance measuring system (F value of the optical system: 8.2) employing a measuring light source having a center wavelength of 530 nm and a full width at half maximum value of about 20 nm, whereby the reflectance was 23% when no voltage was applied, 8% when 50 Vrms was applied, and the difference in reflectance between application and non-application of the voltage was 15%.

Example D

A liquid crystal optical element was obtained in the same manner as in Example 6 except that a compound of the formula (3) was used instead of the compound of the formula (4) as the uncured curable compound. To this liquid crystal optical element, the voltage was applied in the same manner as in Example 5, and the reflectance was measured by the same measuring system, whereby the reflectance was 16% when no voltage was applied and 9% when 50 vrms was applied, and the difference in reflectance between application and non-application of the voltage, was 7%.

EXAMPLE 7

A mixture (mixture F) comprising 95 parts of a nematic liquid crystal having a negative dielectric anisotropy ($T_c$= 98° C., $\Delta\epsilon$=−5.6, $\Delta n$=0.220), 5 parts of an uncured curable compound of the formula (4), and 0.15 part of benzoin isopropyl ether, was prepared.

This mixture F was injected into a liquid crystal cell prepared by bonding a pair of substrates having thin polyimide films for vertical alignment formed on transparent electrodes so that the thin polyimide films faced each other, via a very small amount of resin beads of 6 μm, by an epoxy resin printed in a width of about 1 mm along the four sides.

While maintaining this cell at 25° C., ultraviolet rays of 3 mW/cm$^2$ from the upper side and ultraviolet rays of about 3 mW/cm$^2$ from the lower side were irradiated for 10 minutes by a HgXe lamp having a main wavelength of about 365 μm, to obtain a liquid crystal optical element.

An operation of applying a voltage of 30 Vrms with a rectangular wave of 50 Hz to this liquid crystal optical element for 10 minutes and then removing the voltage, was repeated ten times.

Then, the transmittance was measured by a transmittance measuring system (F value of the optical system: 11.5) employing a measuring light source having a center wavelength of 530 nm and a full width at half maximum value of about 20 nm, whereby the transmittance was 86% in a state where no voltage was applied and 24% in a state where 50 Vrms was applied, and the difference in the transmittance between application and non-application of the voltage, was 62%.

Example E

A liquid crystal optical element was obtained in the same manner as in Example 7 except that a compound of the formula (3) was used instead of the compound of the formula (4) as the uncured curable compound. To this liquid crystal optical element, the voltage was applied in the same manner as in Example 7, and the transmittance was measured by the same measuring system, whereby the transmittance was 64% when no voltage was applied and 20% when 30 Vrms was applied, and the difference in transmittance between application and non-application of the voltage, was 44%. The results of the respective Examples are summarized and shown in the following Table 1.

TABLE 1

| Example | Main materials used | Conditions | $T_{VOFF}$ | $T_{VON}$ | $\Delta T$ | CR |
|---|---|---|---|---|---|---|
| 1 | Formula (4) | After | 79% | 23% | 56% | |
| 2 | Formula (4) + chiral agent | | 78% | About 2% | | 33 |
| 3 | Formula (5) + chiral agent | | 80% | About 3% | | 28 |
| 4 | Formula (4) + chiral agent | 20 Vrms | 82% | About 7% | | 11 |
| | | 30 Vrms | 82% | About 2% | | 40 |
| 5 | Formula (4) + Formula (6) + chiral agent | | 82% | About 3% | | 28 |
| 6 | Formula (4) + chiral agent | Reflection type | 23% | 8% | 15% | |
| 7 | Formula (4) + Δε being negative | | 86% | 24% | 62% | |
| A | Formula (3) | | 72% | 29% | 43% | |
| B | Formula (3) + chiral agent | | 61% | About 4% | | 17 |
| C | Formula (3) + chiral agent | 20 Vrms | 57% | About 6% | | 10 |
| | | 30 Vrms | 49% | About 8% | | 6 |
| D | Formula (3) + chiral agent | Reflection type | 16% | 9% | 7% | |
| E | Formula (3) + Δε being negative | | 64% | 20% | 44% | |

Note
CR represents the contrast ratio, and $\Delta T$ represents the difference between $T_{VON}$ and $T_{VOFF}$.

Now, with reference to Examples 8 to 11, the effects resulting from the fact that the uncured curable compound contains at least two types of curable compounds, of which the molecular weights are different by at least two times, will be described. Examples 8 and 10 represent cases where the effects are observed, and Examples 9 and 11 represent cases where no such effects are observed.

EXAMPLE 8

A mixture (mixture A) having 94.6 parts of a cyano type nematic liquid crystal (BL-009, manufactured by Merck), 2.4 parts of a chiral agent (a mixture of S-811, manufactured by Merck and C15 manufactured by Merck in a weight ratio of 1:1), 2.5 parts of a curable compound of the formula (4) having a molecular weight of 382, 0.5 part of an urethane acrylate oligomer (EB-270, manufactured by UCB) having a molecular weight of at least 1500 and 0.09 part of benzoin isopropyl ether, was prepared.

This mixture A was injected into a liquid crystal cell prepared by bonding a pair of substrates having thin polyimide films formed on transparent electrodes and rubbed in one direction, so that the rubbing directions crossed each other, via a very small amount of resin beads having a diameter of 13 μm, by an epoxy resin printed in a width of about 1 mm along the four sides.

While maintaining this liquid crystal cell at 25° C., ultraviolet rays of 3 mW/cm² from the upper side and ultraviolet rays of about 3 mW/cm2 from the lower side, were irradiated for 10 minutes by a HgXe lamp having a main wavelength of about 365 nm, to prepare a liquid crystal optical element.

An operation of applying a voltage of 20 Vrms with a rectangular wave of 50 Hz to this liquid crystal optical element for 10 minutes and then removing the voltage, was repeated ten times. Then, the transmittance was measured by a transmittance measuring system (F value of the optical system: 11.5) employing a measuring light source having a center wavelength of 530 nm and a full width at half maximum value of about 20 nm, whereby the in transmittance was 83% when no voltage was applied, and the value of a contrast ratio obtained by dividing this value by the transmittance when 20 Vrms was applied, was 31.

EXAMPLE 9

A liquid crystal optical element was obtained in the same manner as in Example 8 except that only the compound of the formula (4) was used as the uncured curable compound. To this liquid crystal optical element, the voltage was applied in the same manner as in Example 8, and the transmittance w4s measured by the same measuring system, whereby the transmittance was 83% when no voltage was applied, and the value of a contrast ratio obtained by dividing this value by the transmittance when 20 Vrms was applied, was 11.

EXAMPLE 10

Mixture A prepared in Example 8 was injected into the same liquid crystal cell as in Example 8, and while maintaining it at 25° C., ultraviolet rays were irradiated for 3 minutes in the same manner as in Example 8 to obtain a liquid crystal optical element.

An operation of applying a voltage of 20 Vrms with a rectangular wave of 50 Hz to this liquid crystal optical element for 10 minutes and then removing the voltage, was repeated ten times. Then, the transmittance was measured by a transmittance measuring system (F value of the optical system: 11.5) employing a measuring light source having a center wavelength of 530 nm and a full width at half maximum value of about 20 nm, whereby the transmittance was 79% when no voltage was applied, and the value of a contrast ratio obtained by dividing this value by the transmittance when 20 Vrms was applied, was 43.

EXAMPLE 11

A liquid crystal optical element was obtained in the same manner as in Example 10 except that only the compound of the formula (4) was used as the uncured curable compound.

To this liquid crystal optical element, the voltage was applied in the same manner as in Example 10, and the transmittance was measured by the same measuring system, whereby the transmittance was 81% when no voltage was applied, and the value of a contrast ratio obtained by dividing this value by the transmittance when 20 Vrms was applied, was 12.

Further, the effects resulting from the fact that a chiral agent is incorporated to the above mixture, and the helical pitch of the chiral agent is adjusted to be at least 4 μm and at most three times of the electrode gap, will be described with reference to Examples 12 to 19. Examples 12, 13, 16 and 17 represent cases in which such effects are observed, and Examples 14, 15, 18 and 19 represent cases where no such effects are observed.

EXAMPLE 12

A mixture having 3.5 parts of a chiral agent (a mixture comprising S-811, manufactured by Merck and C15 manufactured by Merck in a weight ratio of 1:1, hereinafter referred to as chiral agent A) uniformly dissolved in 100 parts of mixture A, was prepared (mixture H). Then, it was injected into a wedge cell for measuring the helical pitch, and the pitch was measured, whereby the helical pitch was found to be 5.1 μm.

This mixture H was injected into a liquid crystal cell prepared by bonding a pair of substrates having thin polyimide films formed on transparent electrodes and rubbed in one direction, so that the rubbing directions crossed each other, via a very small amount of resin beads having a diameter of 13 μm, by an epoxy resin printed in a width of about 1 mm along the four sides.

While maintaining this liquid crystal cell at 25° C., ultraviolet rays of 3 mW/cm$^2$ from the upper side and ultraviolet rays of about 3 mW/cm$^2$ from the lower side, were irradiated for 10 minutes by a HgXe lamp having a main wavelength of about 365 nm, to prepare a liquid crystal optical element.

An operation of applying a voltage of 50 Vrms with a rectangular wave of 50 Hz to this liquid crystal optical element for 10 minutes and then removing the voltage, was repeated ten times. Then, the transmittance was measured by a transmittance measuring system (F value of the optical system: 11.5) employing a measuring light source having a center wavelength of 530 nm and a full width at half maximum value of about 20 nm, whereby the transmittance was 78% when no voltage was applied, and the value of a contrast ratio obtained by dividing this value by the transmittance when 50 Vrms was applied, was 23.

In a case where the transmittance of this liquid crystal optical element when no voltage was applied, was 100%, and the transmittance when a voltage of 50 Vrms was applied, was 0%, the applied voltage showing a transmittance of 50% i.e. a value ($V_{50}$) of the applied voltage showing a change of 50% in transmittance, was 23 Vrms.

EXAMPLE 13

A mixture having 1.5 parts of the chiral agent A of Example 12 uniformly dissolved in 100 parts of the mixture A of Example 12, was prepared (mixture I). In the same manner as in Example 12, it was injected into a wedge cell for measuring the helical pitch, and the pitch was measured, whereby the helical pitch was 10.8 μm.

This mixture I was injected into a liquid crystal cell having the same structure as used in Example 12, and ultraviolet rays were irradiated in the same manner at 25° C. to cure the uncured curable compound, to form a liquid crystal optical element.

An operation of applying a voltage of 50 Vrms with a rectangular wave of 50 Hz to this liquid crystal optical element for 10 minutes and then removing the voltage, was repeated ten times. Then, the transmittance was measured by the same transmittance measuring system as in Example 12, whereby the transmittance was 81% when no voltage was applied, and the value of a contrast ratio obtained by dividing this value by the transmittance when 50 Vrms was applied, was 23, and $V_{50}$ was 19 Vrms.

EXAMPLE 14

Without adding any chiral agent, mixture A of Example 12 was injected into a liquid crystal cell having the same structure as used in Example 12, and ultraviolet rays were irradiated in the same manner at 25° C. to cure the uncured curable compound, to obtain a liquid crystal optical element.

In this liquid crystal cell, the alignment directions were crossed each other, whereby as injected into the cell, mixture A shows a helical pitch of about four times of the distance between the electrodes of the cell, on appearance.

An operation of applying a voltage of 50 Vrms with a rectangular wave of 50 Hz to this liquid crystal optical element for 10 minutes and then removing the voltage, was repeated ten times. Then, the transmittance was measured by the same transmittance measuring system as in Example 12, whereby the transmittance was 79% when no voltage was applied, and the value of a contrast ratio obtained by by dividing this value by the transmittance when 50 Vrms was applied, was 3.2, and $V_{50}$ was 18 Vrms.

EXAMPLE 15

A mixture having 7.5 parts of the chiral agent A of Example 12 uniformly dissolved in 100 parts of the mixture A of Example 12, was prepared (mixture J). In the same manner as in Example 12, it was injected into a wedge cell for measuring the helical pitch, and the pitch was measured, whereby the helical pitch was 2.4 μm.

This mixture J was injected into a liquid crystal cell having the same structure as used in Example 12, and ultraviolet rays were irradiated in the same manner at 25° C., to cure the uncured curable compound, to form a liquid crystal optical element.

An operation of applying a voltage of 50 Vrms with a rectangular wave of 50 Hz to this liquid crystal optical element for 10 minutes and then removing the voltage, was repeated ten times. Then, the transmittance was measured by the same transmittance measuring system as in Example 12, whereby the transmittance was 73% when no voltage was applied, and the value of a contrast ratio obtained by dividing this value by the transmittance when 50 Vrms was applied, was 13, and $V_{50}$ was 31.

EXAMPLE 16

Two parts of a chiral agent (a mixture comprising R-811, manufactured by Merck and CB15 manufactured by Merck in a weight ratio of 1:1, hereinafter referred to as chiral agent B) was uniformly dissolved in 100 parts In of mixture A of Example 12 to prepare a mixture (mixture K). Then, it was injected into a wedge cell for measuring the helical pitch, and the pitch was measured, whereby the helical pitch was found to be 5.7 μm.

This mixture K was injected into a liquid crystal cell having the same structure as used in Example 12, and ultraviolet rays were irradiated for one minute in the same manner as in Example 12 at 25° C. to cure the uncured curable compound, to form a liquid crystal optical element.

An operation of applying a voltage of 50 Vrms with a rectangular wave of 50 Hz to this liquid crystal optical element for 10 minutes and then removing the voltage, was repeated ten times. Then, the transmittance was measured by the same transmittance measuring system as in Example 12, whereby the transmittance was 81% when no voltage was applied, and the value of a contrast ratio obtained by dividing this value by the transmittance when 50 Vrms was applied, was 31, and $V_{50}$ was 22 Vrms.

EXAMPLE 17

0.5 Parts of the chiral agent B of Example 16 was uniformly dissolved in 100 parts of the mixture A of Example 12 to prepare a mixture (mixture L). In the same manner as in Example 12, it was injected into a wedge cell for measuring the helical pitch, and the pitch was measured, whereby the helical pitch was 21 µm.

This mixture L was injected into the same liquid in crystal cell as used in Example 12, and ultraviolet rays were irradiated in the same manner as in Example 16 at 25° C., to cure the uncured curable compound, to obtain a liquid crystal optical element.

An operation of applying a voltage of 50 Vrms with a rectangular wave of 50 Hz to this liquid crystal optical element for 10 minutes and then removing the voltage, was repeated ten times. Then, the transmittance was measured by the same transmittance measuring system as in Example 12, whereby the transmittance was 80% when no voltage was applied, and the value of a contrast ratio obtained by dividing this value by the transmittance when 50 Vrms was applied, was 14, and $V_{50}$ was 17 vrms.

EXAMPLE 18

Without adding chiral agent, mixture A of Example 12 was injected into a liquid crystal cell having the same structure as used in Example 12, and ultraviolet rays were irradiated in the same manner as in Example 16 at 25° C., to cure the uncured curable compound, to obtain a liquid crystal optical element.

This liquid crystal cell was a cell in which the alignment directions crossed each other, whereby as injected into the cell, mixture A shows a helical pitch of about 4 times of the distance between electrodes of the cell, on appearance.

An operation of applying a voltage of 50 Vrms with a rectangular wave of 50 Hz to this liquid crystal optical element for 10 minutes and then removing the voltage, was repeated ten times. Then, the transmittance was measured by the same transmittance measuring system as in Example 12, whereby the transmittance was 78% when no voltage was applied, and the value of a contrast ratio obtained by dividing this value by the transmittance when 50 Vrms was applied, was 3.9, and $V_{50}$ was 10 Vrms.

EXAMPLE 19

Four parts of the chiral agent B of Example 16 was uniformly dissolved in 100 parts of the mixture A of Example 12 to prepare a mixture (mixture M). In the same manner as in Example 12, it was injected into a wedge cell for measuring the helical pitch, and the pitch was measured, whereby the helical pitch was 3.0 µm.

This mixture M was injected into the same liquid crystal cell as used in Example 12, and ultraviolet rays were irradiated in the same manner as in Example 16 at 25° C., to cure the uncured curable compound, to form a liquid crystal optical element.

An operation of applying a voltage of 50 Vrms with a rectangular wave of 50 Hz to this liquid crystal optical element for 10 minutes and then removing the voltage, was repeated ten times. Then, the transmittance was measured by the same transmittance measuring system as in Example 12, whereby the transmittance was 79% when no voltage was applied, and the value of a contrast ratio obtained by dividing this value by the transmittance when 50 Vrms was In applied, was 25, and $v_{50}$ was 28 Vrms.

INDUSTRIAL APPLICABILITY

The liquid crystal optical element of the present invention has high transmittance when it is transparent and has a high contrast or difference in transmittance between application and non-application of an electric field, and thus is suitable for e.g. an optical shutter or a light-controlling glass which is required to provide a high light transmittance when it is transparent.

Also when made into a reflection type liquid crystal optical element, it has a high reflectance at the time when no voltage is applied, and the contrast between application and non-application of an electric field can be made high.

Further, the change in the voltage-transmittance curve or the voltage-reflectance curve due to repetition of an operation of application and non-application of an electric field to the liquid crystal optical element, is small, whereby it is possible to present a highly reliable liquid crystal optical element.

Especially when the above-mentioned curable compound contains two types of curable compounds, of which the molecular weights are different by at least two times, the curing property of the curable compound used will be high, and it is possible to prepare a liquid crystal optical element having a high contrast in the transmittance or reflectance between application and non-application of an electric field, in a short period of curing time, whereby the productivity is high.

Further, the modulus of elasticity or the molecular weight between crosslinking points of the cured resin can be controlled, whereby a liquid crystal optical element showing a high contrast ratio, can be obtained even at a low driving voltage.

Further, when a chiral agent is incorporated to the mixture, and the helical pitch of the chiral agent is adjusted to be at least 4 µm and at most three times of the electrode gap, it is possible to obtain a liquid crystal optical element which can be operated at a low driving voltage and which has a high contrast ratio in the transmittance between application and non-application of an electric field.

Further, the transmittance of the element when it is transparent, can be made high, and irregularities in the transmittance derived from the injection step or the sandwiching step can be made small, whereby it is possible to provide a liquid crystal optical element suitable for e.g. a high quality light-controlling glass or optical shutter.

Further, the contrast ratio can be substantially improved at a low voltage without substantially increasing the driving voltage, whereby it can be used for a display element.

What is claimed is:

1. A method comprising
   sandwiching a mixture that comprises a liquid crystal and an uncured curable compound between a pair of substrates, and
   curing the uncured curable compound to form a liquid crystal/cured composite layer,
   wherein the liquid crystal has a negative dielectric anisotropy, the mixture is free of a chiral agent, the substrates have transparent electrodes, at least one substrate is transparent, and the uncured curable compound comprises a compound of formula (1):

$$A_1-(OR_1)_n-O-Z-O-(R_2O)_m-A_2 \qquad (1),$$

wherein each of $A_1$ and $A_2$, independently of each other, is an acryloyl group, a methacryloyl group, a glycidyl group or an allyl group; each of $R_1$ and $R_2$, independently of each other, is a $C_{2-6}$ alkylene group; Z is a bivalent mesogen structure; and each of n and m, independently of each other, is an integer of from 1 to 10.

2. The method according to claim 1, wherein each of the substrates comprises a vertically orienting film.

3. The method according to claim 2, wherein the vertically orienting films are polyimide films.

4. The method according to claim 3, wherein the polyimide films face one another.

5. The method according to claim 1, wherein Z is a 4,4'-biphenylene group, or a 4,4'-biphenylene group having some or all of the hydrogen atoms substituted by $C_{1-2}$ alkyl groups or halogen atoms.

6. The method according to claim 1, wherein each of $R_1$ and $R_2$ is an ethylene group or a propylene group.

7. The method according to claim 1, wherein each of $A_1$ and $A_2$ is an acryloyl group or a methacryloyl group.

8. The method according to claim 1, wherein each of n and m is from 1 to 4.

9. The method according to claim 1, wherein the uncured curable compound comprises two compounds, and the molecular weight of one compound is twice the molecular weight of another compound.

10. The method according to claim 9, wherein the uncured curable compound comprises a compound having a mesogen structural portion and a curable compound containing no mesogen structural portion.

11. The method according to claim 9, wherein the two compounds have curable sites connectable to each other.

12. The method according to claim 9, wherein at least one of the compounds has a molecular weight of at least 1,000.

13. The method according to claim 1, wherein the mixture further comprises a curing catalyst.

14. The method according to claim 1, wherein the uncured curable compound comprises a plurality of compounds of formula (1) wherein n and m are different.

15. The method according to claim 1, wherein the uncured curable compound comprises at least one non-liquid crystalline compound.

16. A light control element prepared by the method according to claim 1.

* * * * *